United States Patent [19]
Frank et al.

[11] Patent Number: 5,996,088
[45] Date of Patent: Nov. 30, 1999

[54] HIGH-SPEED DATABASE CHECKPOINTING THROUGH SEQUENTIAL I/O TO DISK

[75] Inventors: Richard Frank, Groton, Mass.; Gopalan Arun; Richard Anderson, both of Nashua, N.H.; Stephen Klein, Hollis, N.H.

[73] Assignee: Oracle Corporation, Redwood Shores, Calif.

[21] Appl. No.: 08/787,551

[22] Filed: Jan. 22, 1997

[51] Int. Cl.$^6$ ................................................. G06F 11/00
[52] U.S. Cl. ............................................................. 714/6
[58] Field of Search ......................... 395/182.04, 182.05, 395/182.06, 182.07, 182.08, 182.09, 182.11, 182.18, 182.17; 372/51.1

[56] References Cited

U.S. PATENT DOCUMENTS

| | | | |
|---|---|---|---|
| 5,333,303 | 7/1994 | Mohan | 395/182.18 |
| 5,369,757 | 11/1994 | Spiro et al. | 395/182.17 |
| 5,590,298 | 12/1996 | Kawamoto | 395/182.04 |
| 5,701,473 | 12/1997 | Braseth et al. | 395/182.04 |
| 5,724,581 | 3/1998 | Kozakura | 395/182.04 |
| 5,737,514 | 4/1998 | Stiffler | 395/182.04 |

*Primary Examiner*—Robert W. Beausoliel, Jr.
*Assistant Examiner*—Pierre E. Elisca
*Attorney, Agent, or Firm*—Wagner, Murabito & Hao LLP

[57] ABSTRACT

A method for performing a checkpointing operation in a client/server computer system for safeguarding data in case of a failure. The records of a database are stored in a mass storage device, such as a hard disk drive array. A separate disk drive is dedicated for use only in conjunction with checkpointing. Periodically, when a checkpoint process is initiated, the server writes a number of its modified records to checkpoint files which are stored by the dedicated checkpoint disk drive. The write operation is performed through one or more sequential I/O operations. Thus, the modified records are stored in consecutive sectors of the hard disk drive. If the server becomes disabled, the data can be recovered by reading the contents of the most recent checkpoint files and loading the contents sequentially back to the server's main memory.

20 Claims, 11 Drawing Sheets

HIGH-SPEED DATABASE CHECKPOINTING THROUGH SEQUENTIAL I/O TO DISK

FIELD OF THE INVENTION

The present invention pertains to a method for checkpointing modified data in a database through high-speed sequential I/O to one or more disks.

BACKGROUND OF THE INVENTION

Computers have become an integral tool used in a wide variety of different applications, such as in finance and commercial transactions, three-dimensional and real-time graphics, computer-aided design and manufacturing, healthcare, telecommunications, education, etc. Computers are finding new applications as their performance and speeds ever increase while costs decrease due to advances in hardware technology and rapid software development. Furthermore, a computer system's functionality and usefulness can be dramatically enhanced by coupling stand-alone computers together to form a computer network. In a computer network, users may readily exchange files, share information stored on a common database, pool resources, communicate via e-mail and even video teleconference.

One popular type of network setup is known as "client/server" computing. Basically, users perform tasks through their own dedicated desktop computer (i.e., the "client"). The desktop computer is networked to a larger, more powerful central computer (i.e., the "server"). The server acts as an intermediary between a group of clients and a database stored in a mass storage device. An assortment of network and database software enables communication between the various clients and the server. Hence, in a client/server arrangement, the data is easily maintained because it is stored in one location and maintained by the server; the data can be shared by a number of local or remote clients; the data is easily and quickly accessible; and clients may readily be added or removed.

Although client/server systems offer a great deal of flexibility and versatility, people are sometimes reluctant to use them because of their susceptibility to various types of failures. Furthermore, as computers take on more comprehensive and demanding tasks, the hardware and software become more complex and hence, the overall system becomes more prone to failures. A single server failure may detrimentally affect a large number of clients which are dependent on that particular server. In some mission critical applications, computer downtimes may have serious implications. For example, if a server were to fail in the middle of processing a financial application (e.g., payroll, securities, bank accounts, electronic money transfer, etc.), the consequences may be quite severe. Moreover, customer relations might be jeopardized (e.g., lost airline, car rental, or hotel reservations; delayed or mis-shipped orders; lost billing information; etc.).

Short of totally eliminating all failures which might disable the computer system, the goal is to minimize the amount of time required to bring the computer system back on-line after a failure occurs. In other words, it is important to recover from a failure as quickly as possible. It is also highly preferable to ensure that the failure does not cause any crucial data to become lost. One prior art mechanism for accomplishing both of these goals is known as "checkpointing." Basically, checkpointing periodically updates the data stored in the database with committed data stored in a volatile cache memory. By checkpointing, the database is kept relatively up to date so that when a system failure occurs, less recovery needs to be done.

FIG. 1 is a diagram describing a typical prior art computer system having checkpointing. The system may incorporate a number of clients 101–109 (e.g., personal computers, workstations, portable computers, minicomputers, terminals, etc.) which are serviced by one or more servers 110 and 111. Each of the clients interacts with server nodes 110 and 111 through various client programs, known as "processes, workers, threads, etc." Each of the server nodes 110 and 111 has its own dedicated main memory 113 and 114. Data from a database 116 stored in a large commonly shared storage mechanism, such as a disk array 112, is read into the main memories 113 and 114. Thereby, vast amounts of database data are accessible to either of the servers 110 and 111 for distribution to the various clients 101–109. As data is changed by the users, the modified data is stored back into the main memories 113 and 114. The data is then marked to indicate that they have been changed. Periodically, the marked data is checkpointed back to the database residing in disk array 112. This involves writing all marked data to its corresponding locations in disk array 112. In addition, all changes made after the most recent checkpoint are recorded into a separate log file 115.

When one of the server nodes 110 or 111 crashes, it loses all data contained in its respective main memory. However, most of the changes to the data have already been copied over to the database during the last checkpoint. The database is stored in the nonvolatile disk array 112. Hence, the data is not lost, even though power is unexpectedly termnated. Upon recovery, this data is read from the database and stored back into the main memory. Furthermore, the most recent changes to the data made since the last checkpoint are read back from the log file 115 and made to the main memory.

Although checkpointing addresses the main problems of recovery and data preservation, it nevertheless has several drawbacks. Namely, checkpointing is very costly to implement in terms of processing time. There is a severe performance penalty associated with performing checkpointing primarily because the marked records have to be written back to various disk locations in the database. These locations are usually scattered throughout different physical locations of the disk array 112. Often, thousands of transactions need to be updated during each checkpoint. And each of these transactions typically require its own separate input/output (I/O) operation to gain access to the desired location. Furthermore, if the page to which the data is to be written back is not currently in the main memory, the page must first be read off the disk; the data must then be merged with that page; and the page must then be written back to the disk. This sequence of events requires two synchronous I/O operations. Thus, it is not uncommon for checkpointing to take upwards of half an hour or more to complete. In the meantime, the server is prevented from performing other functions while checkpointing is being processed.

One approach to lightening the burden imposed by checkpointing is to reduce the amount of records being updated per each individual checkpoint. This approach has the added feature of improving the recovery time because data is being updated more frequently. However, the disadvantage to this approach is that it requires many more checkpoints be performed with shorter time intervals between each successive checkpoint.

The other approach is to save all the changes for one large checkpointing operation. This comprehensive checkpointing operation can be performed during off-peak hours. However, the disadvantage to this approach is that, in case of a failure, it takes much longer to recover from that failure. Rather than taking minutes to recover, it can take hours or even a full day to recover, depending on the size of the memory and when the memory was last checkpointed.

Thus, there is a need in the prior art for a checkpointing scheme that ideally: (1) has the capability to update data extremely quickly so as to minimize the time required to perform the actual checkpointing; (2) has a long time interval between successive checkpoints; and (3) also has a fast recovery time. The present invention provides an elegant solution that satisfies each of these goals. With the present invention, checkpointing can be accomplished much more quickly by implementing a few sequential I/O operations rather than thousands of random, scattered I/O operations. Because checkpointing can be performs quickly, more data can be updated at each checkpoint; hence, checkpointing can be performed less frequently. In addition, recovery time is much quicker with the present invention because data is read with a few sequential read operations performed in parallel from one or more dedicated checkpoint files back into the main memory. This is much more efficient than the traditional method of performing thousands of non-related I/O operations.

SUMMARY OF THE INVENTION

The present invention pertains to a method for performing a checkpointing operation in a client/server computer system for safeguarding data in case of a failure. Initially, the records of a database reside in a mass storage device, such as a hard disk drive array. Records retrieved from the database are cached on an as needed basis in the main memory of the server. These records are subsequently modified by application programs running on the various clients coupled to the server. Periodically, a checkpoint process is initiated. The checkpoint process writes all or part of the modified records in the server's cache to checkpoint files. The checkpoint files are stored in a separate checkpoint disk drive. This checkpoint disk drive is dedicated exclusively to performing checkpoint functions. The write operation for copying the modified records from the server cache to the checkpoint disk drive is performed via one or more sequential I/O operations. Thus, the modified records are stored in consecutive sectors of the checkpoint disk drive. Furthermore, a copy of all changes to records that were made subsequent to the latest checkpoint are stored in log files. By executing sequential I/O operations to the checkpoint disk drive rather than scattered I/O operations to the database disk drive, the time required to perform a checkpoint is greatly reduced.

If the server becomes disabled, the data can be recovered by reading the contents of the most recent checkpoint files and loading those contents back to the server's main memory. Again, the read operation can be performed through sequential I/O operations. The log files are then accessed to update the server's main memory to reflect any changes that were made between the time of the latest checkpoint up until the time of the failure. Thereupon, the server can resume its normal mode of operation. Eventually, the modified records are written back to the database.

BRIEF DESCRIPTION OF THE DRAWINGS

The present invention is illustrated by way of example, and not by way of limitation, in the figures of the accompanying drawings and in which like reference numerals refer to similar elements and in which.

Prior Art

Prior Art

DETAILED DESCRIPTION

A method for checkpointing modified data in a database through high-speed sequential I/O to one or more disks is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
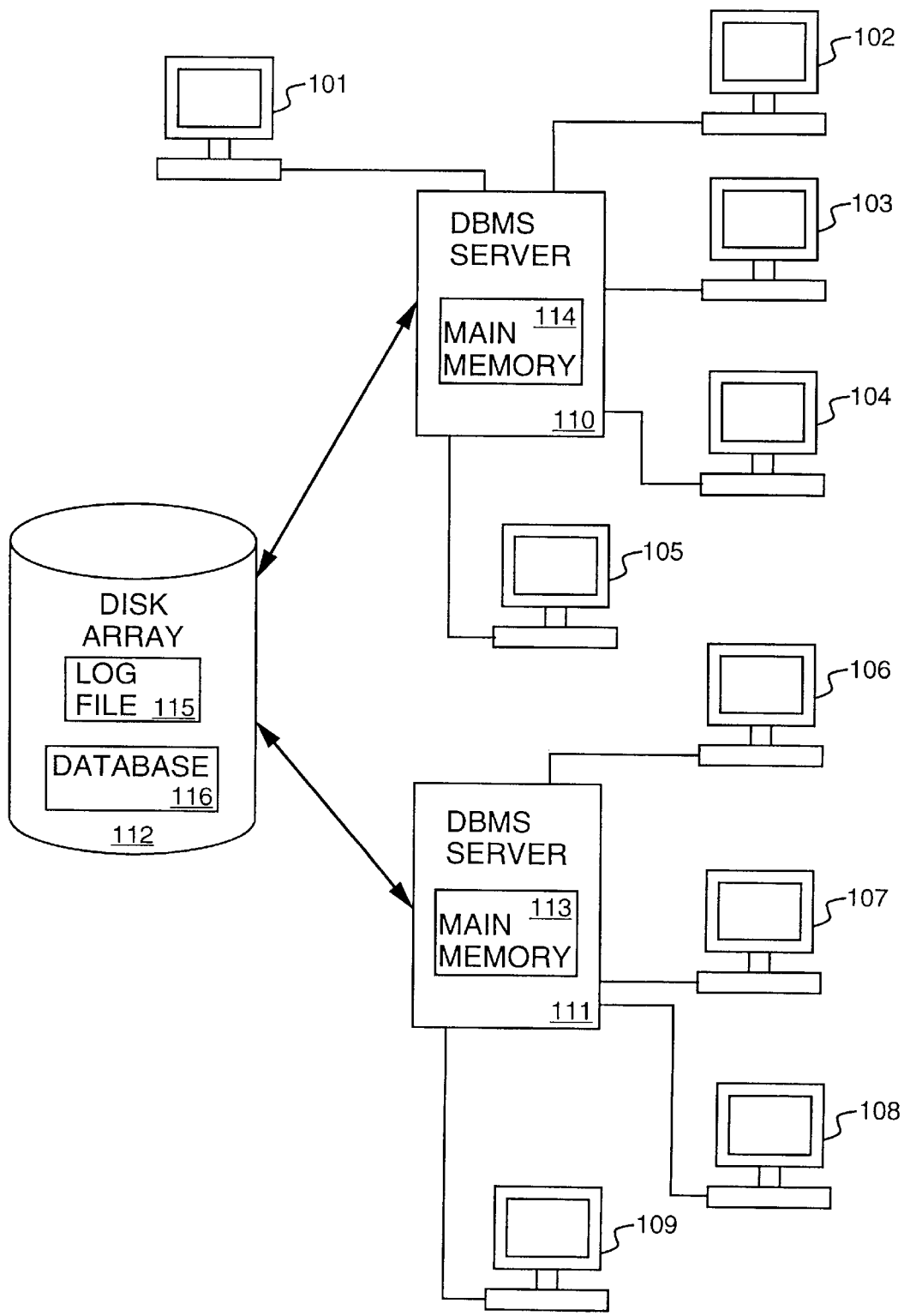
FIG. 1 is a diagram describing a typical prior art computer system having checkpointing.
Figure 2:
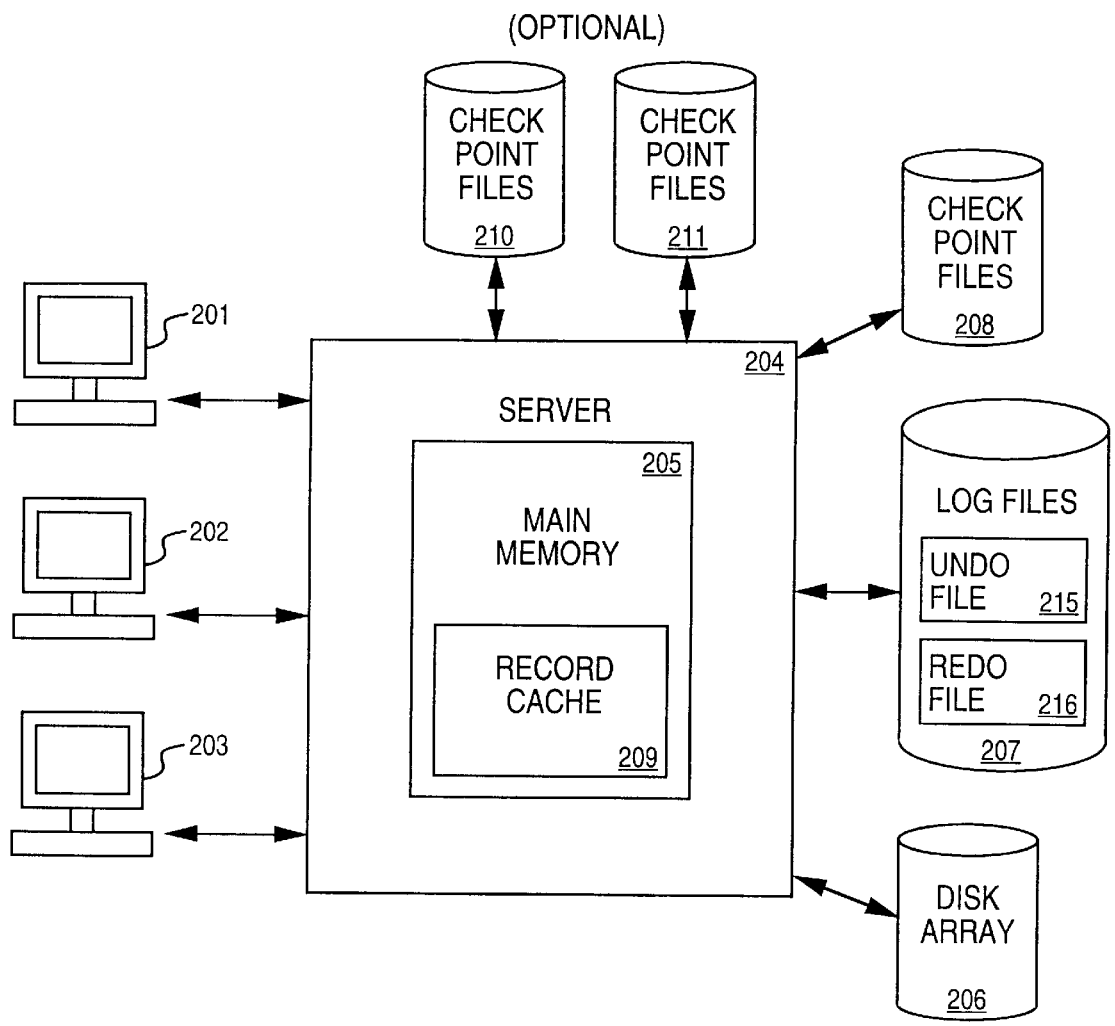
FIG. 2 shows a block diagram of a client/server system upon which the present invention may be practiced.

FIG. 2 shows a block diagram of a client/server system upon which the present invention may be practiced. A number of clients 201–203 are coupled to a server 204. Users run application programs (e.g., spreadsheets, inventory control, schedules, etc.) on the client computers. In turn, server 204 is coupled to disk array 206, log files 207, and checkpoint files 208. The actual database is stored in a plurality of tables which can reside on several of the disks of disk array 206. Whenever clients request particular records, the pages containing the requested records are read from the disk array 206 and put into main memory 205. Main memory 205 consists of gigabytes of random access memory (RAM). In the currently preferred embodiment, a record cache is maintained in main memory 209. A record cache 209 makes more efficient use of the existing memory. Rather than storing an entire page (e.g., 10K bytes long), only the relevant record contained within that page (e.g., 20 bytes of data) is cached. It should be noted, however, that the present invention can be applied to systems having record caches as well as those that operate directly from the page layer and do not have record caching abilities. Processes running on server 204 then fill the requests generated by the various clients 201–203. Thereby, the clients 201–203 gain access to the requested records maintained by the database.

If a client modifies a record (e.g., change of sales information), that record is then marked as having been modified. The new modified record is loaded back into the main memory 205. In addition, each time a record is modified, two journal entries are made to the log files 207. The first journal entry, known as the before image, corresponds to the original record. The purpose of the before image is to retain that record in case a server failure occurs before that transaction commits. The first entry is saved in the "undo" log 215. The second journal entry, known as the after image, corresponds to the new modified record. The second entry is saved in the "redo" log 216. Once that transaction commits, the new modified record is stored as the after image journal entry into the log file. For example, if a record is changed from $200 to $300, a before image journal entry of $200 is stored into the "undo" log file 215. If the server crashes and contents in main memory 205 are lost, the $200 record can be recovered from the before image contained in the "undo" log file 215. After the user decides to make this change permanent, a command is issued to commit that particular transaction. Thereupon, an after image journal entry of $300 is stored into the "redo" log file 216. Now when the server crashes, the new $300 record is retained in the "redo" log file 216 and can be read back into main memory 205.

In the present invention, checkpointing is periodically performed to dedicated checkpoint files 208. The actual checkpointing process involves copying all of the modified data from main memory 205 (and record cache 209) directly into the checkpoint files 208 with one or more sequential I/O operations. In other words, the modified records are written to the checkpoint files 208 in one continuous, uninterrupted bit stream. By performing the writing sequentially, checkpointing can be performed much faster than conventional checkpointing techniques which write modified data back to the database with numerous random, scattered I/O operations. Each scattered I/O operation requires its own seek to move the transducers to the actual physical location of the data to be modified. In contrast, the present invention writes the modified data in a continuous, sequential stream. By writing the data sequentially, the time for performing a checkpoint can be reduced, as an example, from four hours to just five to ten minutes.

Similarly, during recovery, the present invention reads the data back sequentially from the checkpoint files 208 corresponding to the most recent checkpoint and loads it into the main memory 205. In contrast, the prior art recovery procedure requires that the data be accessed on a piecemeal basis whereupon, data is loaded one piece at a time from the database into the main memory. Hence, the present invention significantly improves recovery time as well. With the present invention, once the main memory has been loaded with the contents of the most recent checkpointed data, the log files 207 are accessed to update the data to account for the changes made from the time of the most recent checkpoint to the time of the failure. Thereby, after the server node crashes and loses all data stored in its main memory, the recovery process loads the main memory with a replica of the lost data by reading the data that was copied into the checkpoint files and log files as retained by their respective hard disk drives. Thereupon, the server 204 can continue with its normal mode of operation. Eventually, the modified data in the checkpoint files are written back to the database residing on disk array 206.

In the currently preferred embodiment, several different hard disk drives 208, 210 and 211 are used as dedicated storage devices for the checkpoint files. In this manner, when a checkpoint process is initiated, modified data can be written to these hard disk drives simultaneously. As a result, this enhanced parallel transfer of data further speeds up the checkpointing process. Likewise, recovery can be finished much faster by reading the data back simultaneously through all three disk drives. It should also be noted that disk drives have different speeds (i.e., seek times). Some disk drives are faster, but they are more expensive. In the past, since checkpointing was to the database, all of the corresponding database disk drives (e.g., upwards of hundreds of disk drives 206) had to be fast in order to improve checkpointing and recovery times. However, with the present invention, the fastest disk drives can be used for storing the checkpoint and log files. Rather than spending money purchasing hundreds of high-speed disk drives, the present invention allows the database administrator to purchase only a few high-speed disk drives to achieve fast checkpointing and recovery. Furthermore, by implementing segregated disk drives for storing the checkpointing files, contentions are minimized because they are not accessed by any other processes.

Figure 3:
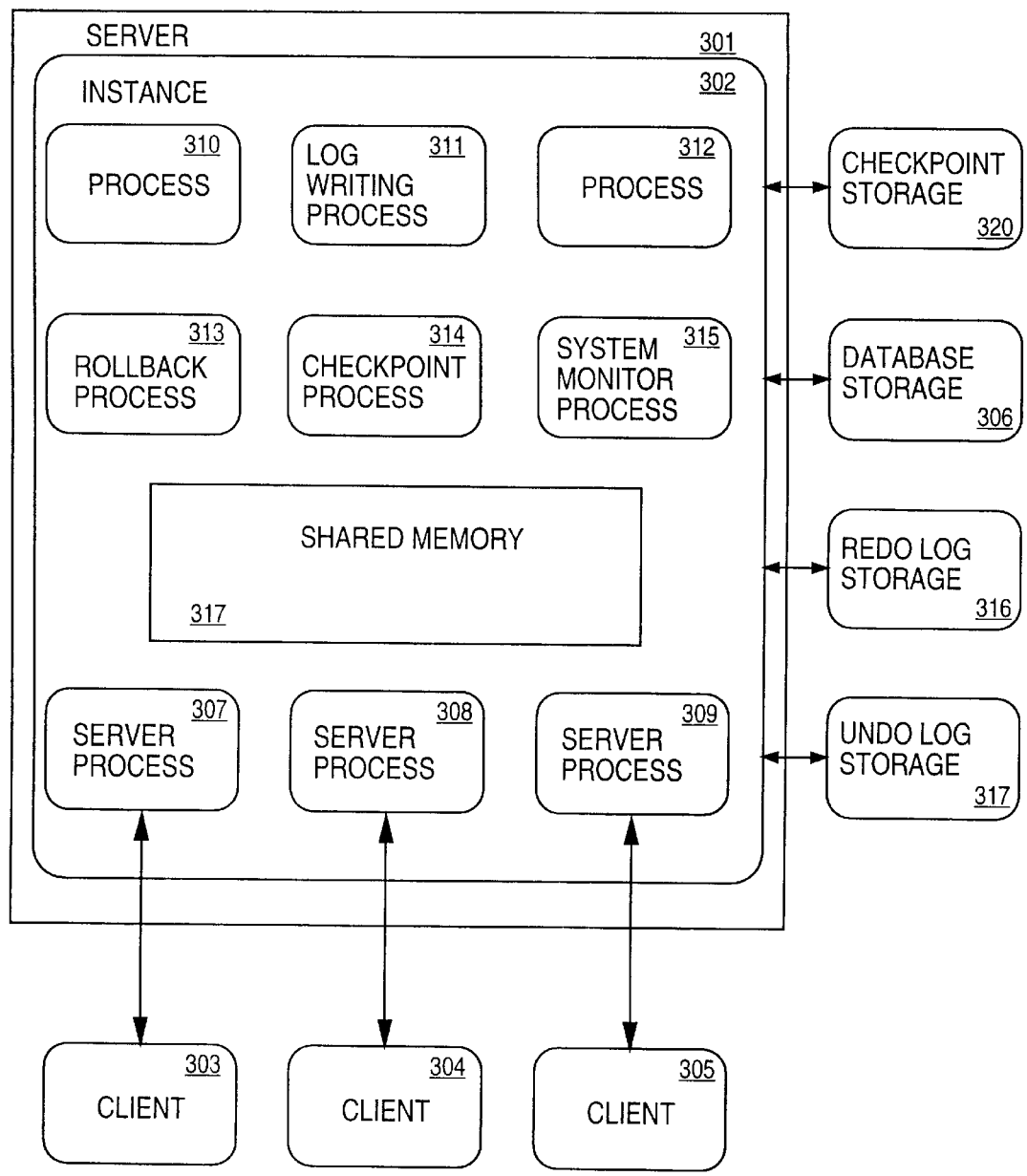
FIG. 3 shows how an instance of a database management system (DBMS) running on server acts as an interface between clients and a database residing within a mass storage device.

FIG. 3 shows how an instance 302 of a database management system (DBMS) running on server 301 acts as an interface between clients 303–305 and a database residing within mass storage 306. An instance 302 is a particular execution of the DBMS on server 301. Applications, such as payroll, inventory, human resources, etc., running on clients 303–305 interact with a corresponding server process 307–309. When a user signs on to a client, a connection is established between that client and server 301; one or more server processes are then spawned. These server processes, together with other dedicated processes 310–315, perform the requested tasks (e.g., fetch data, store data, edit data, etc.) with respect to the database. The server processes include a rollback process 313, a log writing process 311, a system monitor process 315, a checkpoint process 314, and a recovery process 312.

The rollback process 313 performs a rollback function whenever an in-progress transaction is deliberately halted by the user or when a transaction is prematurely halted due to server failure. In the first instance, a user controls whether a proposed transaction is allowed to be actually carried out. If the user wishes to cancel the proposed transaction, the rollback process renders that particular transaction ineffectual so that it has no effect whatsoever on the contents of the database. In other words, the rollback process cancels the proposed transaction so that, as far as the system in concerned, it is as if the transaction had never been entered. Otherwise, if the user is satisfied with the proposed transaction, the transaction is committed. Rollback is made possible by the log writing process 311, which writes information regarding in-flight transactions into a redo log 316. Copies of every transaction (e.g., a before image copy and an after image copy) which modify main memory 317 are stored in an undo log 317 and redo log 316. Each server contains its own copy of an undo log 317 for recording transactions associated with its clients. Each time a record is altered, the before image copy of that record is stored in the undo log 317. A common redo log 316 is used to store an after image copy of the altered record after the transaction is committed. Checkpoint process 314 is used to periodically read modified data from the shared memory 317 and store that data to checkpoint storage device 320. System monitor process 315 is used to perform any recovery that is needed at startup. It is also used to check the functionality of other services hooked up to the network and performs recovery in case of failures.

Figure 4A:
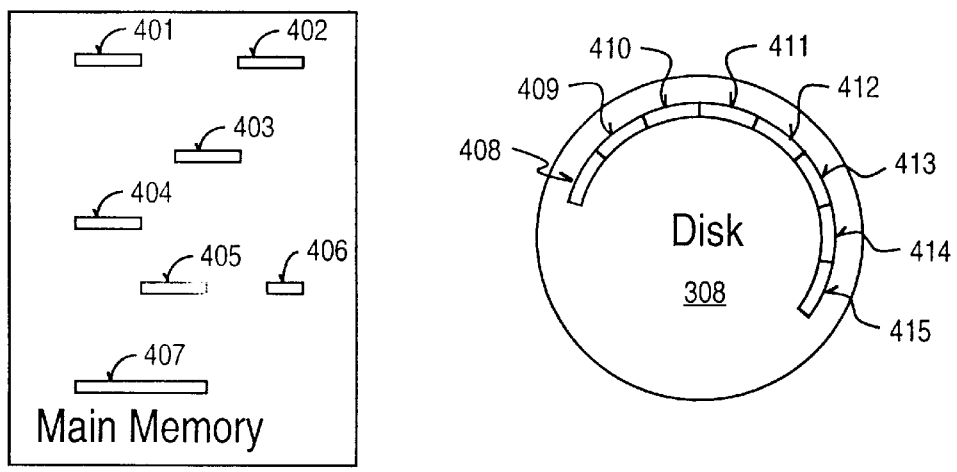
FIG. 4A shows a main memory having several pieces of data which have been modified by one or more of the clients.
Figure 4B:
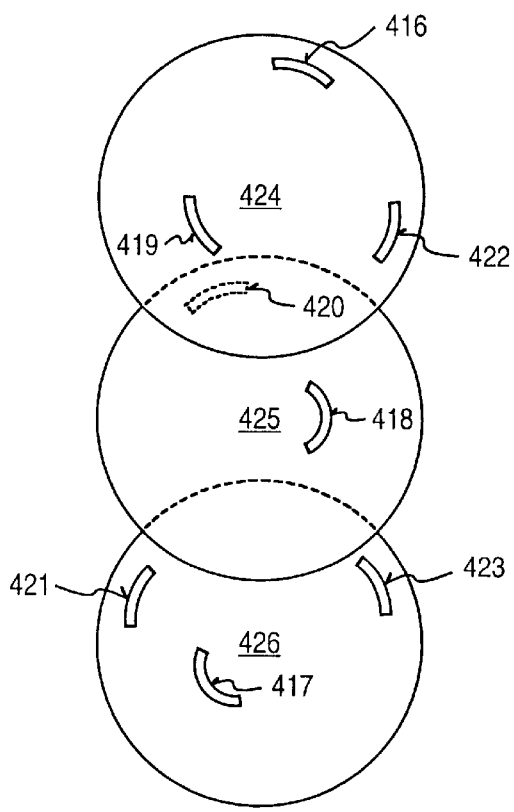
FIG. 4B shows a conventional three disk array, upon which tables of a particular database reside.

FIG. 4A shows a main memory having several pieces of data 401–407 which have been modified by one or more of the clients. During the next checkpoint process, the modified data 401–407 are written to the magnetic disk 308 of a hard disk drive in one continuous I/O operation. A write command is used to write the modified data into sequential, consecutive sectors 408–415. This can be accomplished by simply rotating the disks 308 and writing to sequential sectors of the same track. In contrast, Prior Art FIG. 4B shows three disks 424–426, upon which tables of a particular database reside. In the prior art, each of the modified records 401–407 would have been written to its own corresponding table. These tables are stored in disks 424–426. The result is that the modified records 401–407 may be written to various sectors 416–423, depending on where their particular table resides. For example, modified record 401 might be written to sector 416. Consequently, the disk drive would perform a seek operation to place the transducer over sector 416. Next, modified record 402 might have to be written to sector 417. This requires another seek operation to rotate disk 426 and servo the transducer to place it over sector 417. This process is repeated for each of the modified records. All of these different seek operations consume a large amount of time, especially if thousands or millions of records need to be checkpointed.

Figure 5:
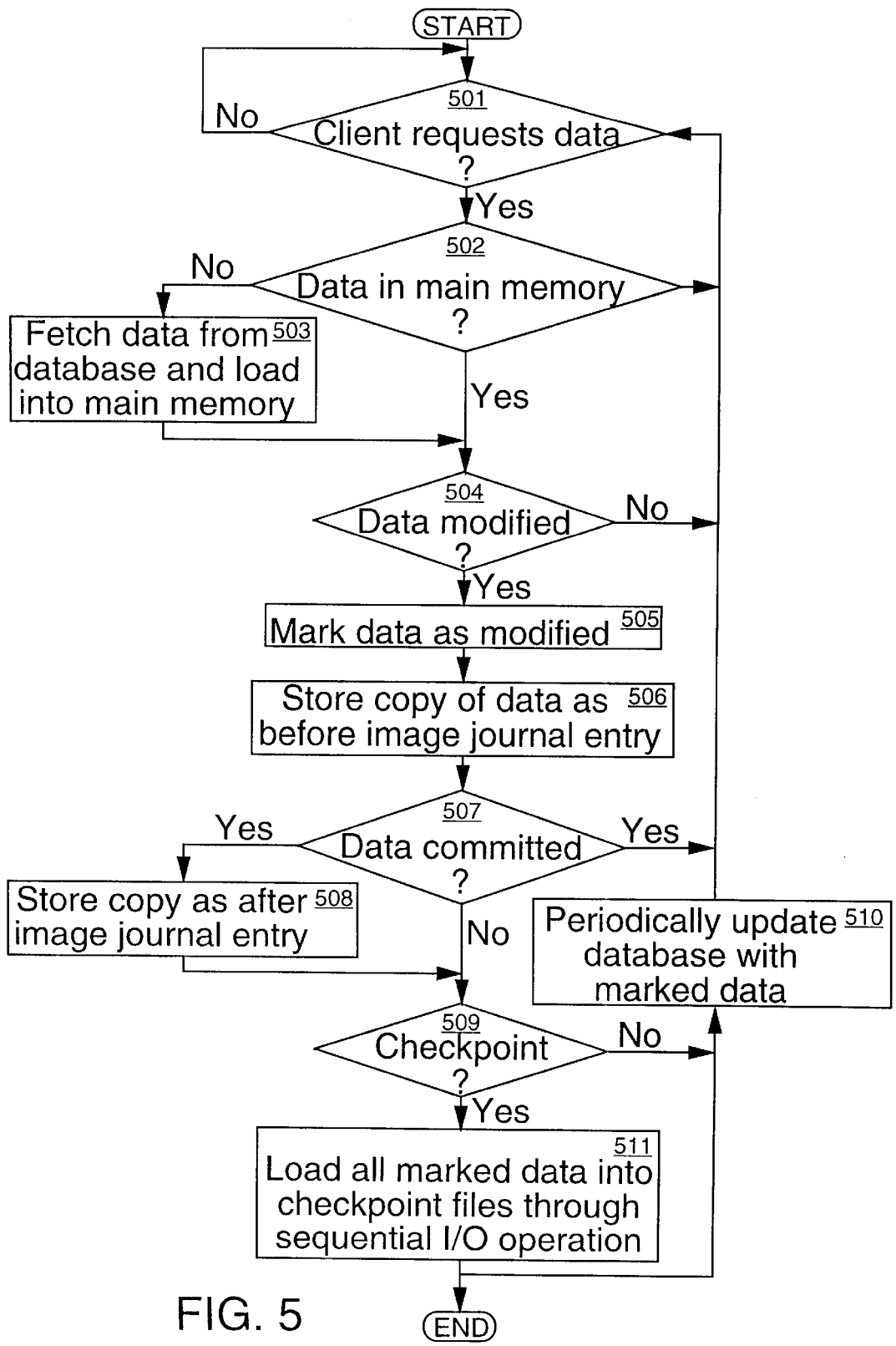
FIG. 5 is a flowchart describing the detailed steps for performing the checkpointing process according to the present invention.

FIG. 5 is a flowchart describing the detailed steps for performing the checkpointing process according to the present invention. Initially, when a client requests data, as determined in step 501, the server checks its main memory to determine whether a copy of the requested data currently exists in the cache, step 502. If a copy does not exist in the cache, the requested data has to be retrieved from the database and loaded into the main memory, step 503. Otherwise, the cache data is forwarded to the client. The client may then make changes to the data, step 504. If changes are made, the data is marked as having been modified, step 505. A marked copy of the modified data is then stored as a before image journal entry in the undo log, step 506. When the transaction corresponding to the modified data is committed, step 507, the marked copy is then stored as an after image journal entry in the redo log, step 508. A determination is made as to whether a checkpoint process is to be made in step 509. Because checkpointing can be accomplished much faster with the present invention, the system can perform checkpoints more frequently to decrease the time intervals in-between checkpoints. The effect is that recovery can be accomplished much faster because the checkpoint files contain more recent a copy of data. If a checkpoint operation is specified, copies of all marked data in the main memory is stored in a non-volatile checkpoint file, step 511. This is accomplished through one or more sequential I/O operations. Finally, the database is periodically updated with the modified data, step 510.

Figure 6:
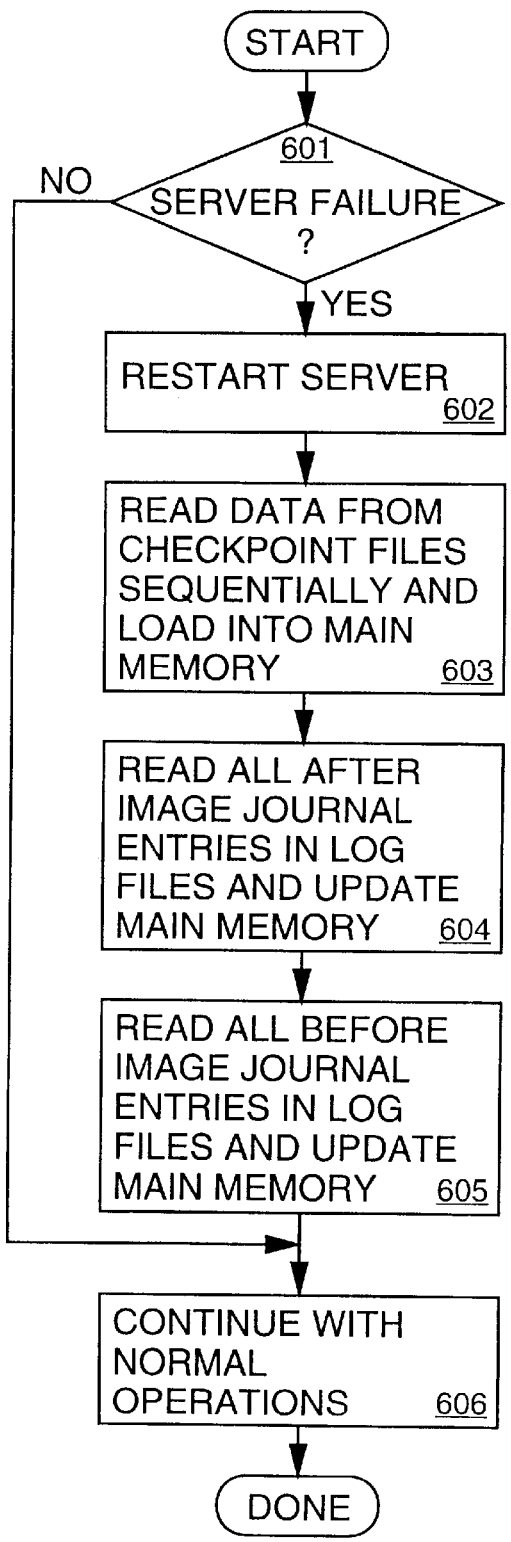
FIG. 6 is a flowchart describing the detailed steps for performing the recovery process according to the present invention.

FIG. 6 is a flowchart describing the detailed steps for performing the recovery process according to the present invention. Initially, the system monitor determines whether the server is working properly, step 601. If the server is working properly, it continues with its normal mode of operation, step 606. However, if the server becomes disabled (e.g., power failure), the database administrator restarts or reboots the server, step 602. Next, a recovery operation is used to recover the data that was dropped from the server's main memory due to the failure. This is accomplished by reading the copy of the modified data that was stored in the checkpoint files, step 603. The read operation is performed sequentially. This read data is loaded back into the server's main memory. Similarly, the before image journal entries that had occurred after the most recent checkpoint are read from the log files, step 604. This before image data is used to update the main memory data. Next, the after image journal entries that had occurred after the most recent checkpoint are also read from the log files, step 604. Now, the server can continue with its normal mode of operations, step 606.

Figure 7:
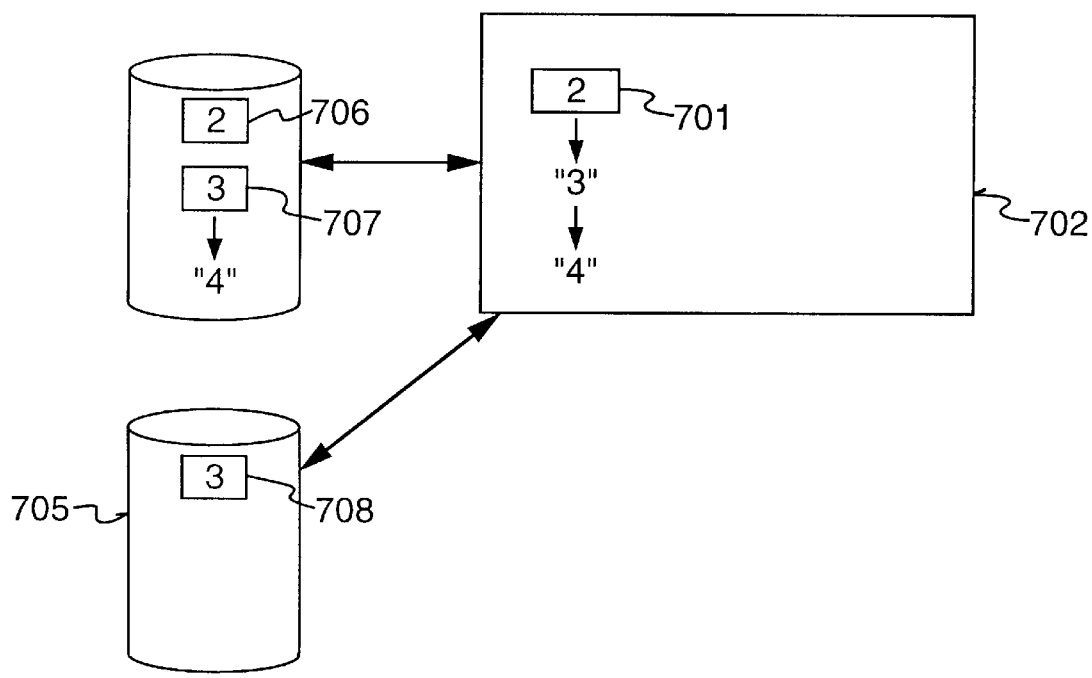
FIG. 7 shows an example of a checkpointing and log writing operation according to the present invention.

FIG. 7 shows an example of a checkpointing and log writing operation according to the present invention. Suppose that a client changes the content of record 701 from the number "2" to the number "3." The server first checks the cache 702 to determine whether record 701 is currently cached. If record 701 does not currently reside within the cache 702, the server goes to the disk containing record 701, fetches that particular page corresponding to record 701, and loads it into the page layer. Optionally, the server may load record 701 into a record cache. Next, the content of record 701 is modified from a "2" to a "3." A before image entry 706 of "2" corresponding to record 701 is stored in the redo log. Once the transaction completes, an after image entry 707 of "3" is stored in a separate redo log. The before image entry 706 of "2" can now be deleted. Standard bookkeeping operations are performed to track the location of record 701. During checkpointing time, record 701 is appended into a special buffer. The size of the buffer is equivalent to the size of a single I/O operation (e.g., 127 blocks long). Once the buffer is filled, its contents are transferred sequentially to the checkpoint disk 705 through an asynchronous direct memory access (DMA). Hence, checkpoint disk 705 contains an entry 708 of "3" corresponding to record 701. Upon completion of checkpointing, the after image entry 707 of "3" corresponding to record 701 can be deleted from log files 704. If a failure occurs on the server node, the entry 708 is loaded back to the cache memory 702 for record 701.

Now suppose that subsequent to the checkpoint, record 701 is changed from "3" to the number "4" and committed. This causes the after image entry 707 corresponding to record 701 to be changed from a "3" to a "4." Note that the checkpoint files still contains the value "3" for record 701. If the server node crashes, the recovery process loads the value "3" from the checkpoint files 705 into the record 701 location. Next, the log files 704 are consulted. Based on the after image entry 707 of log files 704, the server knows to change the contents of record 701 from a "3" to a "4."

Now suppose that subsequent to the checkpoint, record 701 is changed from "3" to the number "4" and committed. This causes the after image entry 707 corresponding to record 701 to be changed from a "3" to a "4." Note that the checkpoint files still contains the value "3" for record 701. If the server node crashes, the recovery process loads the value "3" from the checkpoint files 705 into the record 701 location. Next, the log files 704 are consulted. Based on the after image entry 707 of log files 704, the server knows to change the contents of record 701 from a "3" to a "4."

Eventually, the modified data has to be written back to the database residing on the disk array. Otherwise, the main memory would be completely filled with modified data; there would be no more free memory available for caching new pages and/or records. Hence, there must be a mechanism for unmarking modified data and clearing them from the cache. Modified data can be unmarked and its corresponding space in memory reclaimed only after it has been copied into the appropriate location in the database. Consequently, the present invention provides a mechanism for write-back of modified data back to the database associated with the high-speed checkpointing method described above. In the past, writeback operations were used to clear the entire cache. Essentially, the goal of the prior art systems was to keep the cache as "clean" as possible; all modified data was written back to the database as part of a checkpoint operation.

In contrast, the present invention dears a small portion of enough memory so that there is just enough memory available for new data to be cached. Rather than writing back all modified data and clearing the entire memory, the present invention determines an approximate amount of new data that is conservatively expected to be written to the cache. A corresponding number of modified data is then written back to the database to clear the cache so that there is room enough to accommodate all of the new data anticipated to be cached. There are several advantages to the present invention of only clearing a small portion of cache in order to meet anticipated demands. One advantage is that of improved efficiency. Since data is now written back on an as needed basis, fewer writeback operations are required. In addition, most of the "hot" data is kept retained in the cache rather than being written back. As a result, whenever a client requests a particular piece of "hot" data, that data already resides in the cache and does not have to be loaded from the database. This improved efficiency translates into faster response times. Furthermore, the writebacks can be performed opportunistically so as to have minimal impact on the system's overall performance as described below.

Figure 8:
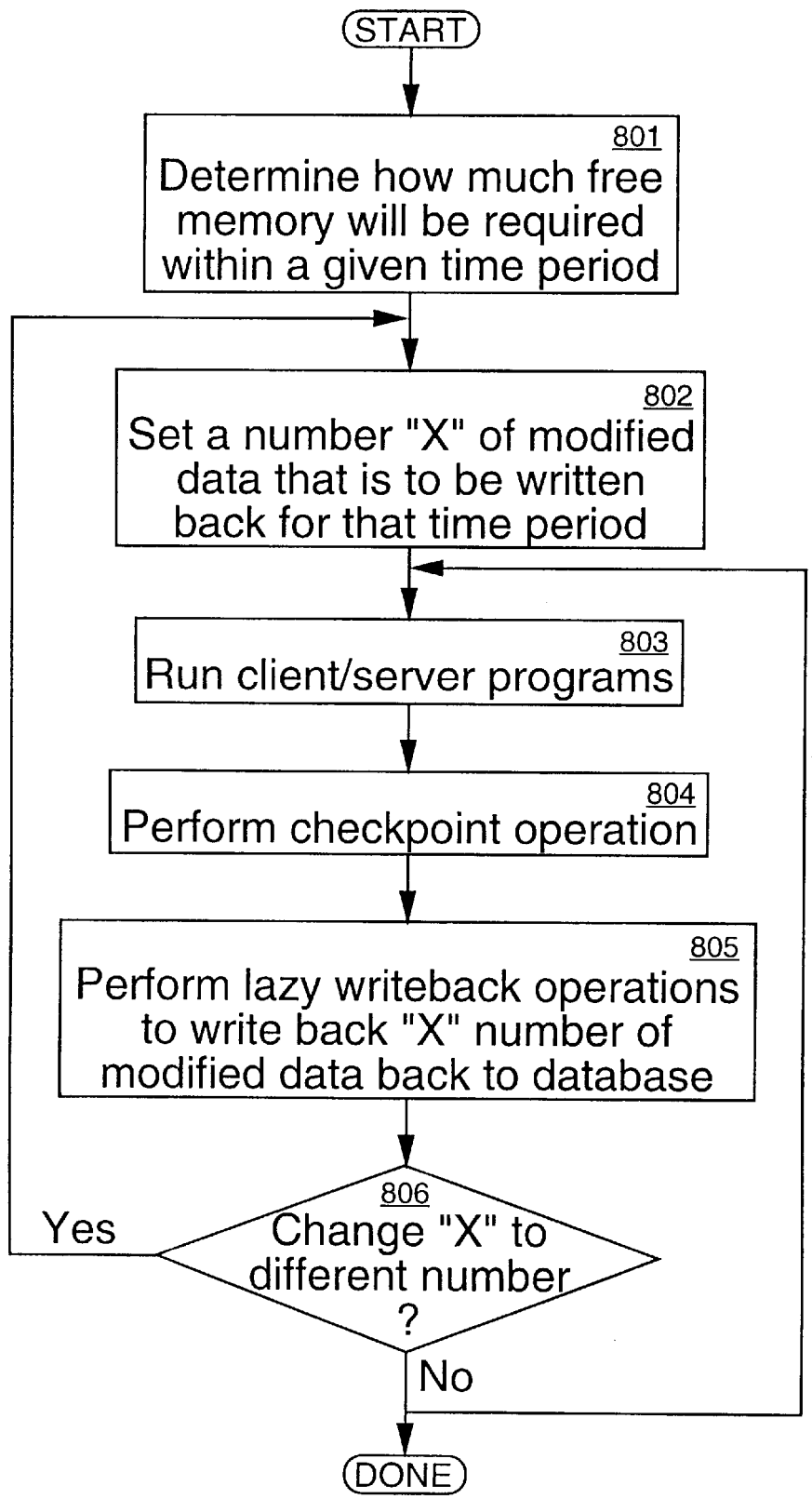
FIG. 8 is a flowchart describing the writeback operation according to the present invention.

FIG. 8 is a flowchart describing the writeback operation according to the present invention. Initially, a determination is made as to how much free memory is going to be required within a given time period, step 801. This determination is based on a number of factors, such as past history and experience, the particular applications that are running, the size and performance characteristics of the client/server system, etc. Based on this determination, the database administrator then sets a number of modified data that is to be written back from the cache to the database within the allotted time span, step 802. Thereafter, the client/server system continues with its normal mode of operation, step 803. Periodically, the server performs a checkpoint operation as described above, step 804. In the meantime, writebacks to the database are executed to clear the cache, step 805. The number of lazy writebacks to be performed can subsequently be changed by the database administrator, step 806. If the cache is becoming too clogged all the time, the database administrator can increase the number of data to be written back. Conversely, if too much of the cache is being cleared, the database administrator can decrease the number of data to be written back.

The present invention handles-writebacks with a two-pronged strategy to minimize the impact on overall system performance. The first writeback approach involves using the resources provided by the record cache server (RCS). Basically, an RCS sweeper process is used to copy modified data back to the database according to a pre-determined moderated sweep. In the currently preferred embodiment, the RCS sweeper process looks for each marked record, reads the corresponding page in which the record belongs, copies the record into the page, and unmarks the record. The number of records swept per second is a controllable function. This smoothes out the impact of the sweep function on the overall system behavior.

Figure 9:
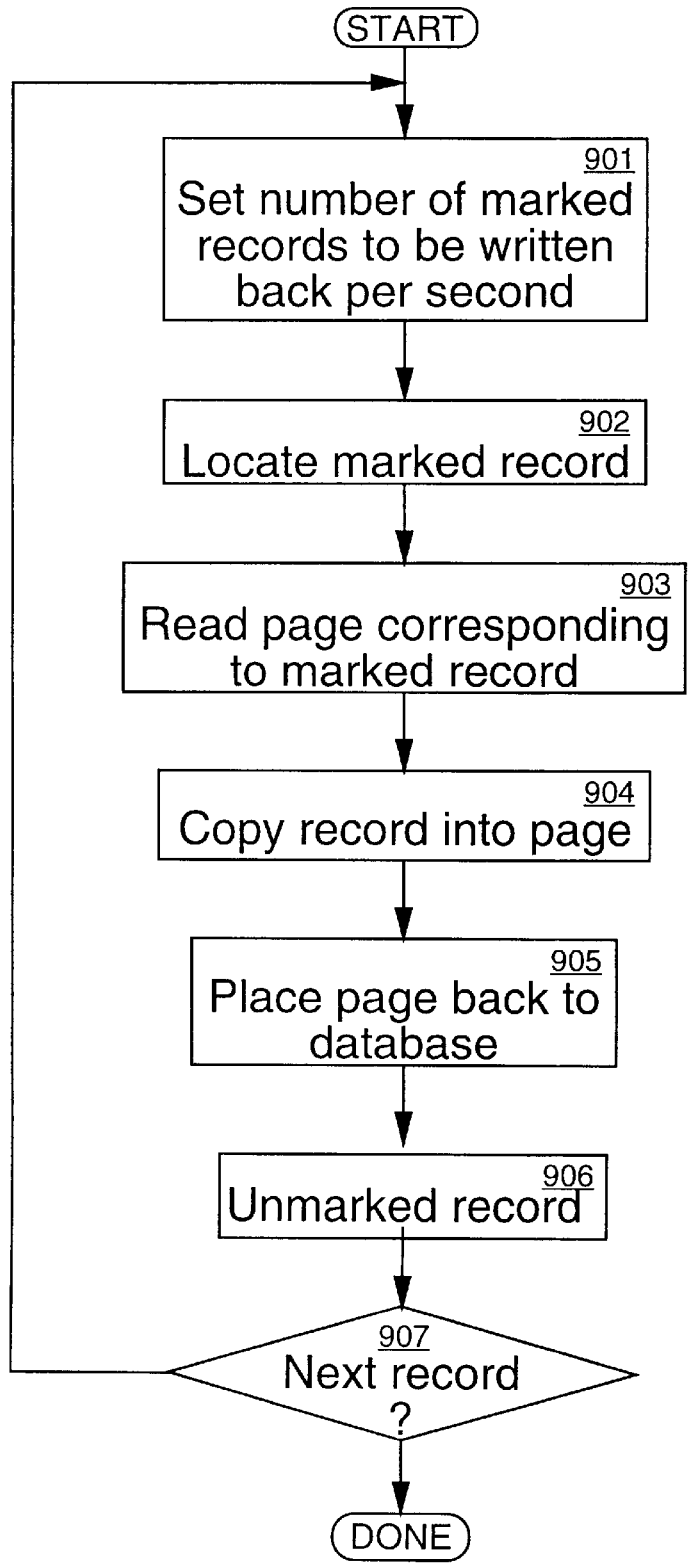
FIG. 9 is a flowchart describing in detail the steps for performing a moderated RCS sweeper process.

FIG. 9 is a flowchart describing in detail the steps for performing a moderated RCS sweeper process. Initially, the database administrator sets the number of modified or marked records to be swept per second, step 901. Steps 902–907 correspond to the sweeper process. In step 902, a marked record is located by the RCS sweeper process. If the page corresponding to that marked record is currently not opened, it is fetched from the database, step 903. The marked record is then copied into that page, step 904. Later, the page is placed back to the database, step 905. The record is unmarked, step 906. A determination is made as to whether an additional marked record is to be swept, step 907.

The second writeback approach involves employing the help of certain user processes for writing back modified records. This writeback approach is attractive because it is opportunistic and has a relatively small impact on the system performance. Basically, whenever a transaction commits, the user process checks the records that it has modified. If the page in which this record resides happens to be available in memory (i.e., in the page cache or local buffer pool), the transaction just copies the modified record into the page. Thereby, this approach avoids the performance penalty of reading the page from the database residing on the disk array. Once the record is copied into the page, the record can then be immediately unmarked. As a result, marked records are cleared extremely quickly by simply writing it back to its corresponding page. Thereafter, user process is finished with that record. It can immediately start processing another task and does not have to wait until the page gets written back to the disk. There is no urgency for writing the page back to disk. This can be performed anytime. Hence, this type of writeback scheme is referred to as being a "lazy" writeback. Eventually, the page gets written back to the database according to one of several possible replacement schemes. One such replacement scheme is that of replacing the least recently used (LRU) page. The page will slowly migrate out of the buffer pool and fall off the end when the page cache is cycled through. This strategy is extremely useful for records that are modified once and never reused in the foreseeable future. Since such a record would most likely be fetched from disk when first used, its retaining page is likely to be in memory when the transaction commits.

Figure 10:
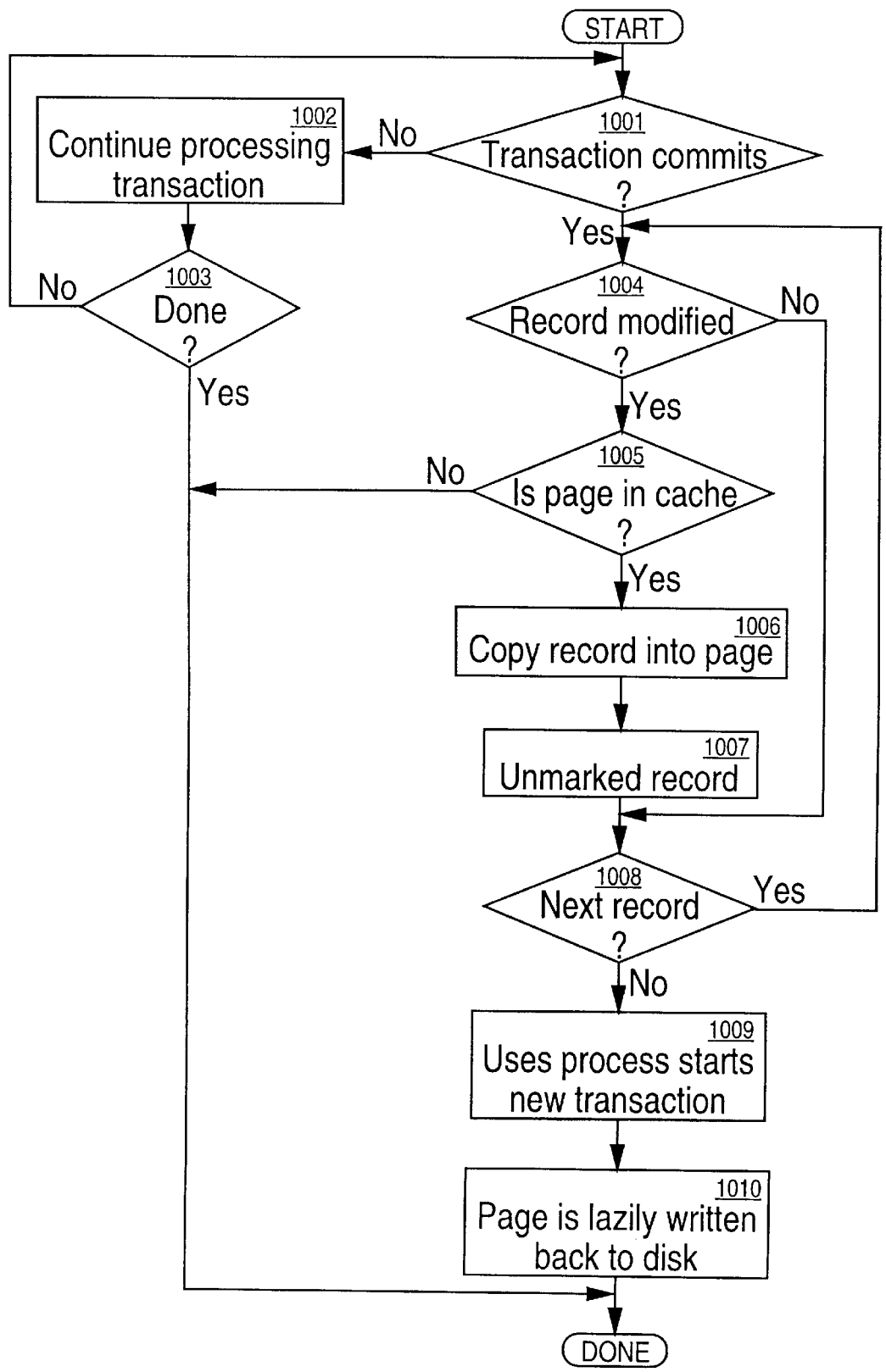
FIG. 10 is a flowchart showing the detailed steps for utilizing a user process to clear marked records.

FIG. 10 is a flowchart showing the detailed steps for utilizing a user process to clear marked records. Initially, one or more records are accessed by a user process. The user may read the accessed records and decide to make certain updates or modifications to these records. If the user desires to make the changes permanent, the transaction is committed. Otherwise, the changes are not made and the records retain their original status. Step 1001 monitors the case whereby a transaction is committed. If the transaction is not committed, it continues until it is done, steps 1002–1003. Whenever a transaction does commit, a determination is made as to whether one of its associated records has been modified, step 1004. If the current record has not been modified, the next record affiliated with the committed transaction is examined to determine whether it has been modified, step 1008. In this manner, all records associated with the committed transaction are individually examined to determine whether it has been modified.

If a record has been modified, a determination is made as to whether the page corresponding to that particular marked record coincidentally happens to be in the page cache, step 1005. A page could be in memory coincidentally because multiple tables of records are contained in a page. If the page is not currently in the page cache, then the nothing happens; the record remains marked. However, if the page currently resides in the page cache, the record is copied into that page, step 1006. That record can immediately be unmarked, and its space in the record cache becomes available, step 1007. Note that the record can be unmarked without the attendant penalty of an I/O operation. This advantage is possible because a copy of the most recent record is stored in the log file. After all records corresponding to the committed transaction have been thusly cycled through, the user process may start a new transaction, step 1009. Eventually, the page is lazily written back to the disk, step 1010.

In one embodiment of the present invention, a number of user processes are designated to help in the writeback of marked records. These "helper" processes perform their routine transactions as programmed. However, in the course of their normal transaction execution, if a helper process happens to touch (i.e., read or modify) any marked record in the cache, it will write back and unmark that modified record. This is accomplished by fetching the corresponding page from the disk array, copying the record onto that page, and writing the page back to the database residing on the disk array. The main advantage for having multiple helper processes over just a single RCS sweeper process is that the RCS sweeper occasionally attempts to write out a marked record that is currently locked by an active user process. The marked record is locked because the user process is engaged in modifying that record. As such, all other processes are prevented from accessing that record until the lock is released. Hence, the RCS sweeper must wait for release of the lock or it can skip over that record in the process of sweeping through the cache. Now, the helper process holding the lock has the capability of writing out and unmarking the record. Hence, no additional locks would be needed, and lock conflicts would be avoided as well. However, it defeats the purpose of the record cache if all processes were to be designated as helper processes. Consequently, the database administrator should designate only those user processes as helpers that have lax response time requirements. Furthermore, for any such designated helper process, the database administrator can also indicate how many records per transaction should be swept. When that maximum count is reached, the transaction should stop sweeping so that it can meet its response time requirements.

As an example, suppose that the task of user process "A" is to take in new sales orders and update the appropriate sales records. Hence, it is imperative that process "A" executes new orders as fast as possible. Otherwise, if the time response were to be too slow, new sales might be lost as they might be prevented from being accepted. On the other hand, suppose that the task of a user process "B" is that of a report writer which is used to keep a tally of the revenues on a quarterly basis. In this situation, there is much less urgency in having user process "B" complete its transaction as quickly as possible. The consequences of having to wait a couple of minutes for the report to be generated is not severe. Consequently, the database administrator can assign user process "B" as a designated helper. Now, whenever a new sales order is received, user process "A" simply fetches the page corresponding to the appropriate record from the disk array, caches the record, modifies the record according to the new information, and marks the record. It should be noted that user process "A" is not required to write the modified record back to the database on the disk array. Instead, user process "A" can immediately accept and start processing the next order. Later, when designated helper process "B" goes to read that particular record, it takes notice that the record is marked. In response, designated helper process "B" copies the record onto the corresponding page. If the page is not currently in the page layer, it is fetched from the disk array. The page is then eventually flushed from the cache by an LRU process. In addition, other user processes, such as billing, invoice, order manifest, etc., can be selected as designated helpers to aid in the writeback of marked records as well.

Figure 11:
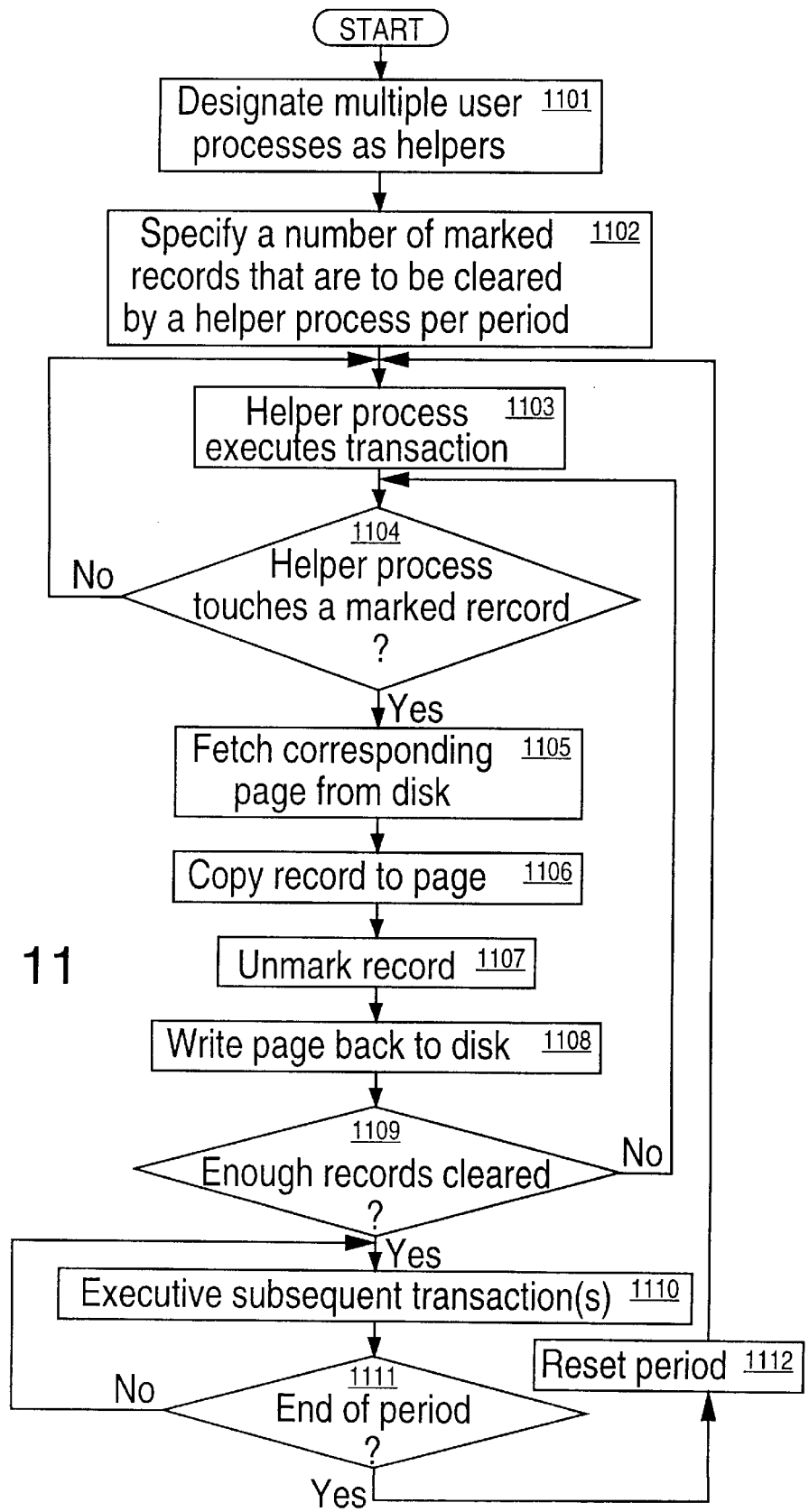
FIG. 11 is a flowchart describing the steps for utilizing multiple helper processes to aid in the writeback of marked records.

FIG. 11 is a flowchart describing the steps for utilizing multiple helper processes to aid in the writeback of marked records. Initially, the database administrator designates multiple user processes as helpers, step 1101. The database administrator also specifies a number of marked records that are to be cleared by each of the helper processes per second, step 1102. The helper processes perform their regular course of executing transactions. In the course of executing their transactions, a determination is made as to whether a marked record happens to be touched. If no marked record is touched, the helper processes continue with their normal mode of operation, step 1103. Otherwise, if a marked record is touched, that particular record is written back and cleared according to steps 1105–1108. In step 1105, the page corresponding to the marked record is fetched from the disk array. The marked record is copied onto that page and then cleared, steps 1106 and 1107. The page is eventually written back to the disk array, step 1108. In step 1109, a determination is made as to whether the helper process has completed all of its designated number of marked records for that time period. If additional records need to be cleared by that helper process during the current time period, step 1104 is repeated. Otherwise, that particular helper process continues execution of subsequent transactions without anymore writebacks of marked records until the time period has elapsed, steps 1110–1111. Whereupon, the time period is reset, step 1112.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for performing a checkpointing operation in a computer system for safeguarding data in case of a failure, comprising the steps of:

storing data in a database residing in a first non-volatile memory device;

caching a first piece of data and a second piece of data from the database into a volatile main memory of a computer;

modifying the first piece of data and the second piece of data in the main memory;

marking the first piece of data and the second piece of data as being modified; and writing the marked first piece of data and the second piece of data from the volatile main memory into a checkpoint file stored in a second non-volatile memory device, wherein the writing operation of every marked piece of data is performed as a sequential uninterrupted input/output operation, the second non-volatile memory being separate from the first non-volatile memory, and wherein the checkpoint file is separate and distinct from the database.

2. The method of claim 1, wherein the marked first piece of data and the marked second piece of data are written to consecutive sectors of a hard disk drive.

3. The method of claim 1 further comprising the step of determining whether the computer has become disabled, wherein if the computer is disabled, a recovery process comprising the following steps is performed:

reading the first piece of data and the second piece of data from the file stored in the second non-volatile memory;

loading the first piece of data and the second piece of data that was read into the main memory of the computer.

4. The method of claim 3 further comprising the steps of:

storing a copy of the first piece of data into a log file;

updating the main memory of the computer with the contents of the log file upon recovery if the first piece of data has been modified since a last checkpointing operation was performed.

5. The method of claim 1 further comprising the step of simultaneously writing to a plurality of hard disk drives in parallel when performing the checkpointing.

6. The method of claim 1, wherein the second non-volatile memory is faster than the first non-volatile memory.

7. The method of claim 1 further comprising the step of:

writing the data periodically from the checkpoint file into the database residing on the first non-volatile memory.

8. A client/server computer system comprising:

a plurality of client computers for running application programs;

a server computer coupled to the plurality of client computers for servicing the requests generated by the client computers, wherein the server includes a cache memory;

a mass storage device coupled to the server for storing a database containing a plurality of records, wherein selected records are loaded into the cache memory of the server;

a non-volatile storage device coupled to the server for performing checkpointing, wherein modified records stored in the cache memory of the server are written sequentially to the non-volatile storage device during a checkpointing operation.

9. The clent/server computer system of claim 8, wherein the modified records are written to consecutive sectors of a hard disk drive.

10. The client/server computer system of claim 8, wherein a system monitor process determines whether the server has become disabled, wherein if the server is disabled, a recovery process reads the modified records from the non-volatile memory and loads the modified records into the cache memory of the server.

11. The client/server computer system of claim 8 further comprising a second non-volatile memory coupled to the server for storing changes made to any records subsequent to a most recent checkpoint.

12. The client/server computer system of claim 8, further comprising a plurality of hard disk drives which are written to sequentially and in parallel when performing a checkpointing operation.

13. The client/server computer system of claim 8, wherein the non-volatile memory corresponding to checkpointing is faster than the mass storage device corresponding to the database.

14. A computer-readable medium having stored thereon instructions for causing a client/server computer network to perform checkpoint comprising the steps of:

storing a plurality of records in a database residing in a first disk drive;

caching a first record and a second record read from the database into a main memory of the server;

modifying the first record and the second record cached in the main memory;

checkpointing the first record and the second record which have been modified by performing a sequential I/O operation to copy the first record and the second record to a checkpoint file stored by a second disk drive, wherein the second disk drive is separate from the first disk drive.

15. The computer-readable medium of claim 14, wherein the first record and the second record are written to consecutive sectors of the second hard disk drive.

16. The computer-readable medium of claim 14 further comprising the step of determining whether the server has become disabled, wherein if the server is disabled, a recovery process which loads the first record and the second record from the second hard disk drive into the main memory of the server is performed.

17. The computer-readable medium of claim 14 further comprising the steps of:

storing a copy of the first record into a log file;

updating the main memory of the computer with the contents of the log file upon recovery if the first record has been modified since a last checkpoint operation was performed.

18. The computer-readable medium of claim 14 further comprising the step of simultaneously writing to a plurality of hard disk drives in parallel when performing the checkpointing.

19. The computer-readable medium of claim 14, wherein the second hard disk drive used for storing checkpointed records is faster than the first hard disk drive used for storing the database.

20. A method for performing a checkpointing operation in a computer system for safeguarding data in case of a failure, comprising the steps of:

storing data in a database residing in a first non-volatile memory;

caching a first piece of data and a second piece of data from the database into a volatile main memory of a computer;

modifying the first piece of data and the second piece of data in the main memory;

marking the first piece of data and the second piece of data as being modified;

writing the marked first piece of data and the second piece of data from the volatile main memory into a checkpoint file stored in a second non-volatile memory, wherein the writing operation is performed sequentially, the second non-volatile memory being separate from the first non-volatile memory; and writing the data periodically from the checkpoint file into the database residing on the first non-volatile memory.

* * * * *

UNITED STATES PATENT AND TRADEMARK OFFICE
CERTIFICATE OF CORRECTION

PATENT NO. : 5,996,088  
APPLICATION NO. : 08/787551  
DATED : November 30, 1999  
INVENTOR(S) : Richard Frank et al.

Page 1 of 1

It is certified that error appears in the above-identified patent and that said Letters Patent is hereby corrected as shown below:

Claim 9, column 13, line 31, delete "clien/server" and insert --client/server--

Signed and Sealed this
Third Day of July, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 5,996,088 | Page 1 of 1 |
| APPLICATION NO. | : 08/787551 | |
| DATED | : November 30, 1999 | |
| INVENTOR(S) | : Richard Frank et al. | |

It is certified that error appears in the above-identified patent and that said Letters Patent is hereby corrected as shown below:

Claim 9, column 13, line 31, delete "clent/server" and insert --client/server--

This certificate supersedes the Certificate of Correction issued July 3, 2012.

Signed and Sealed this
Ninth Day of October, 2012

David J. Kappos
*Director of the United States Patent and Trademark Office*